C. B. GRAY.
MACHINE FOR CUTTING SHEET FORM MATERIAL.
APPLICATION FILED MAR. 26, 1919. RENEWED FEB. 5, 1921.

1,381,088.

Patented June 7, 1921.
7 SHEETS—SHEET 1.

Inventor
Charles B. Gray
By Cyrus Kehr
Attorney

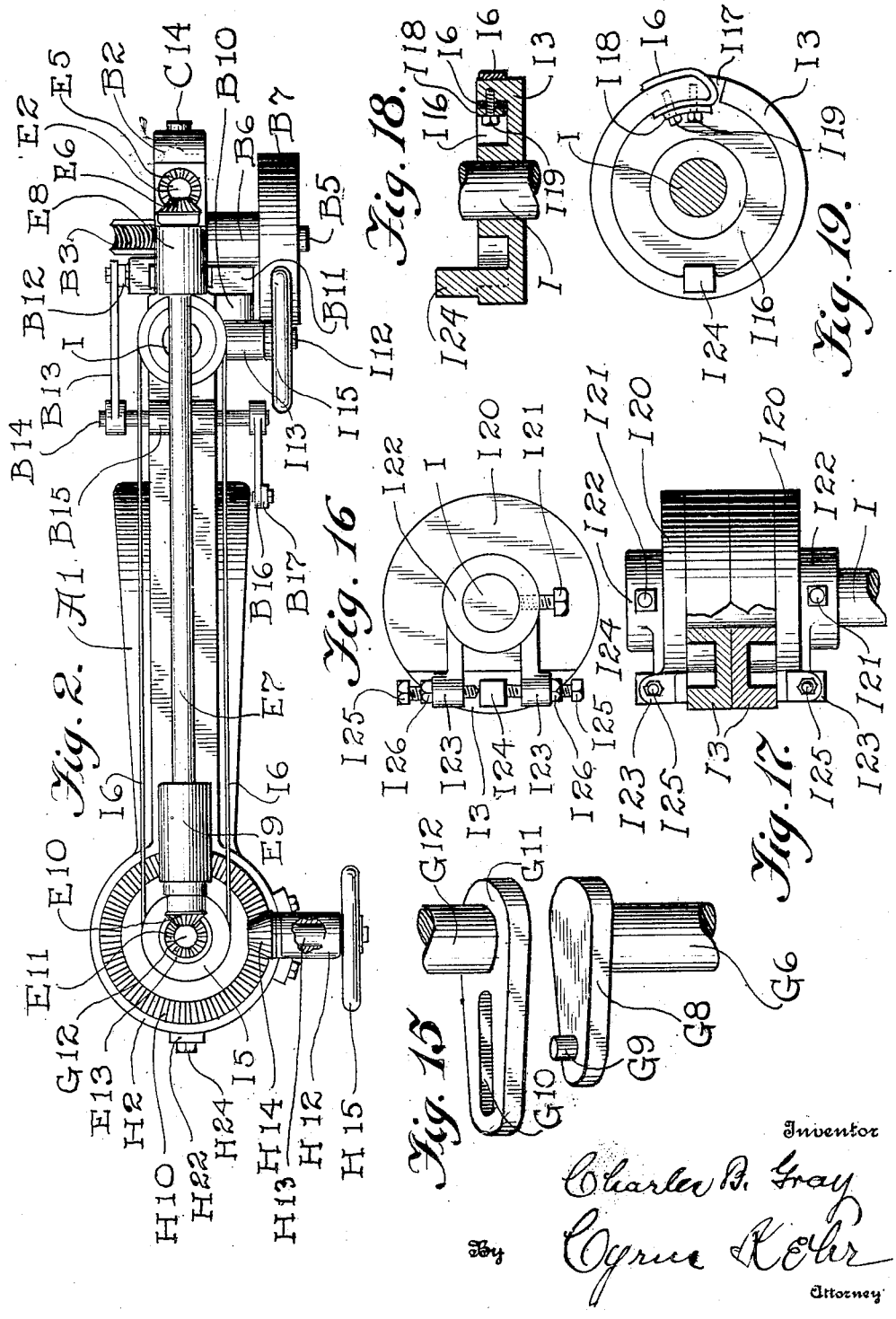

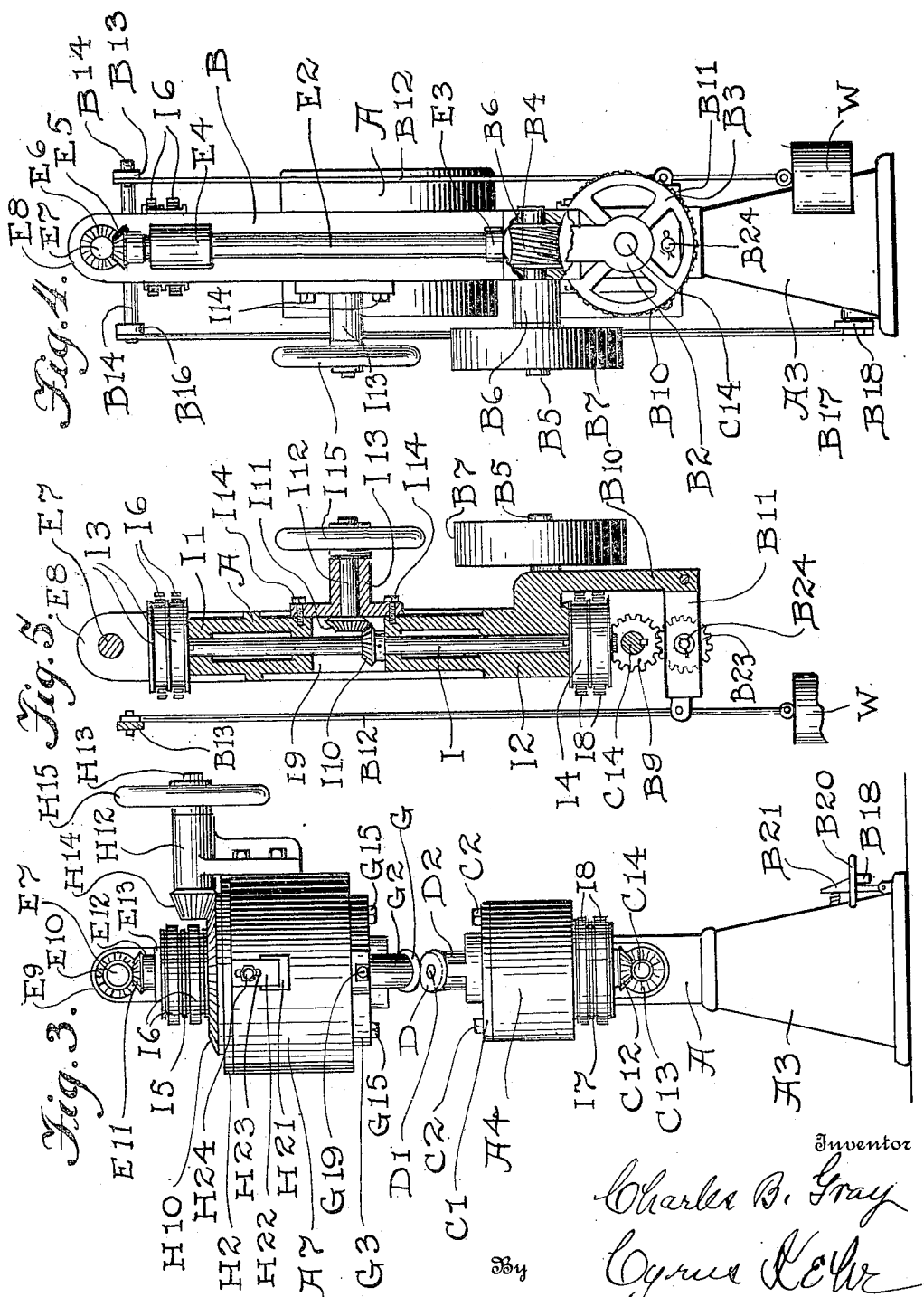

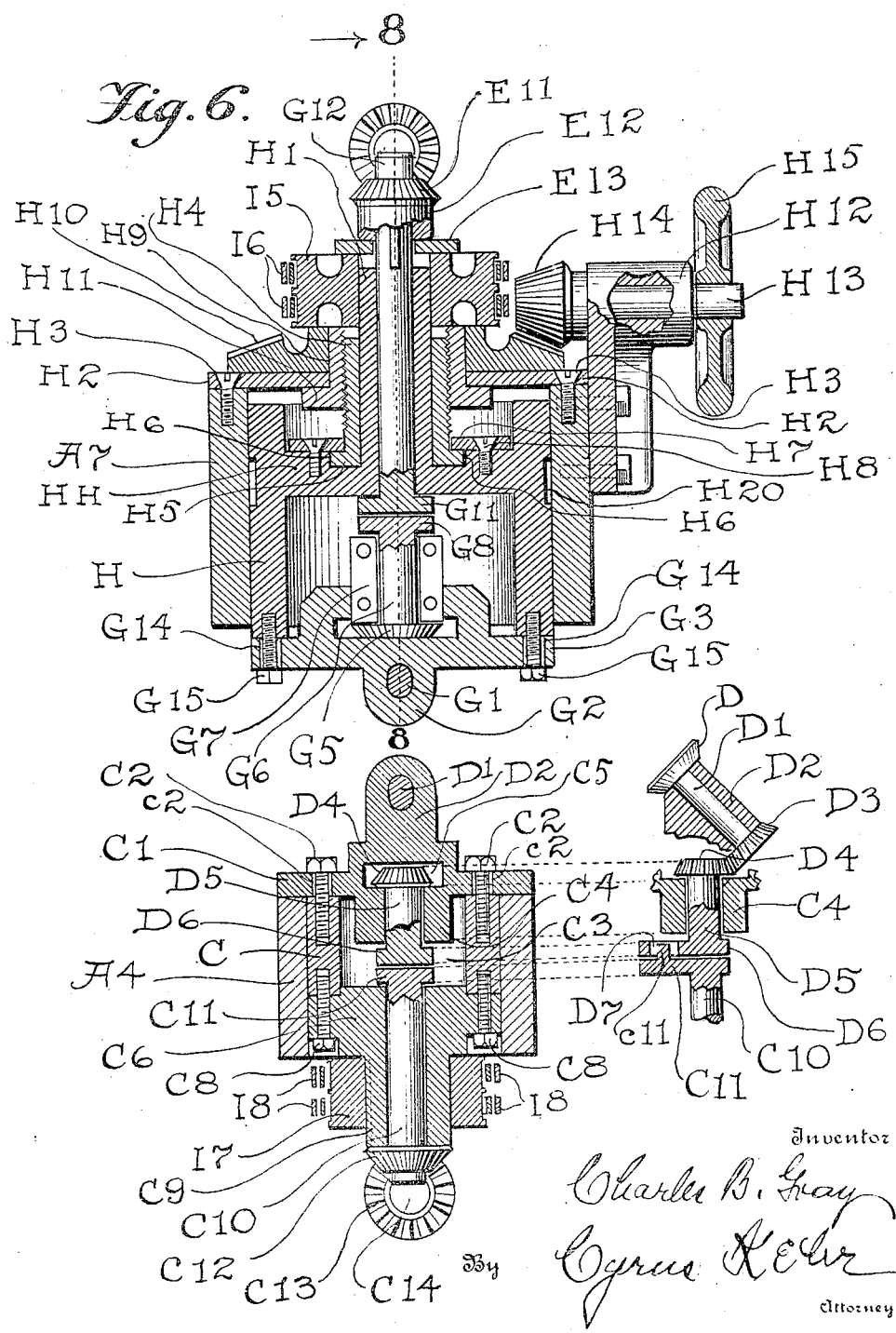

C. B. GRAY.
MACHINE FOR CUTTING SHEET FORM MATERIAL.
APPLICATION FILED MAR. 26, 1919. RENEWED FEB. 5, 1921.
1,381,088.
Patented June 7, 1921.
7 SHEETS—SHEET 5.
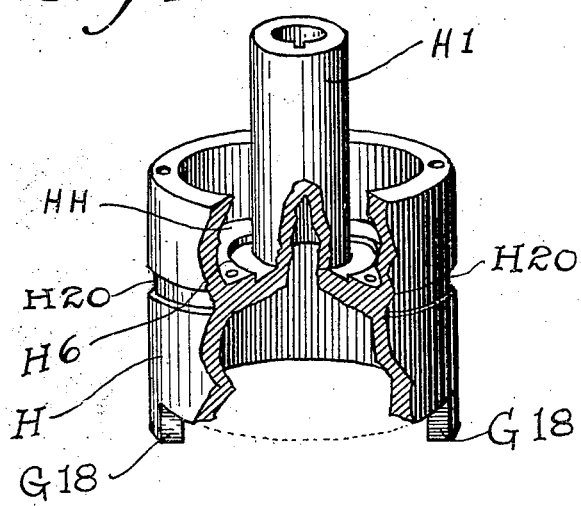
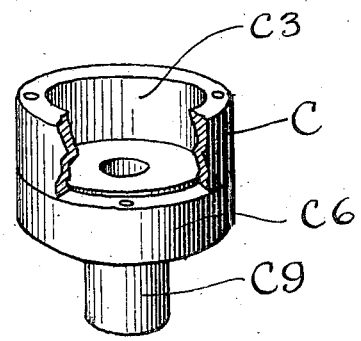
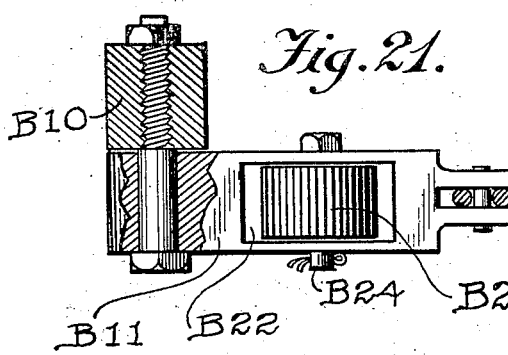
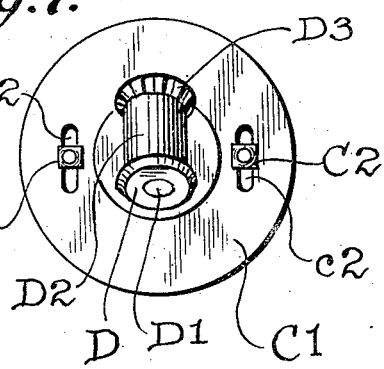
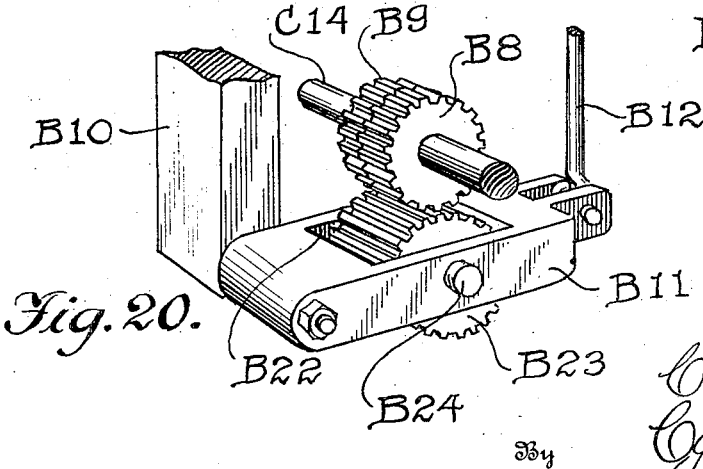

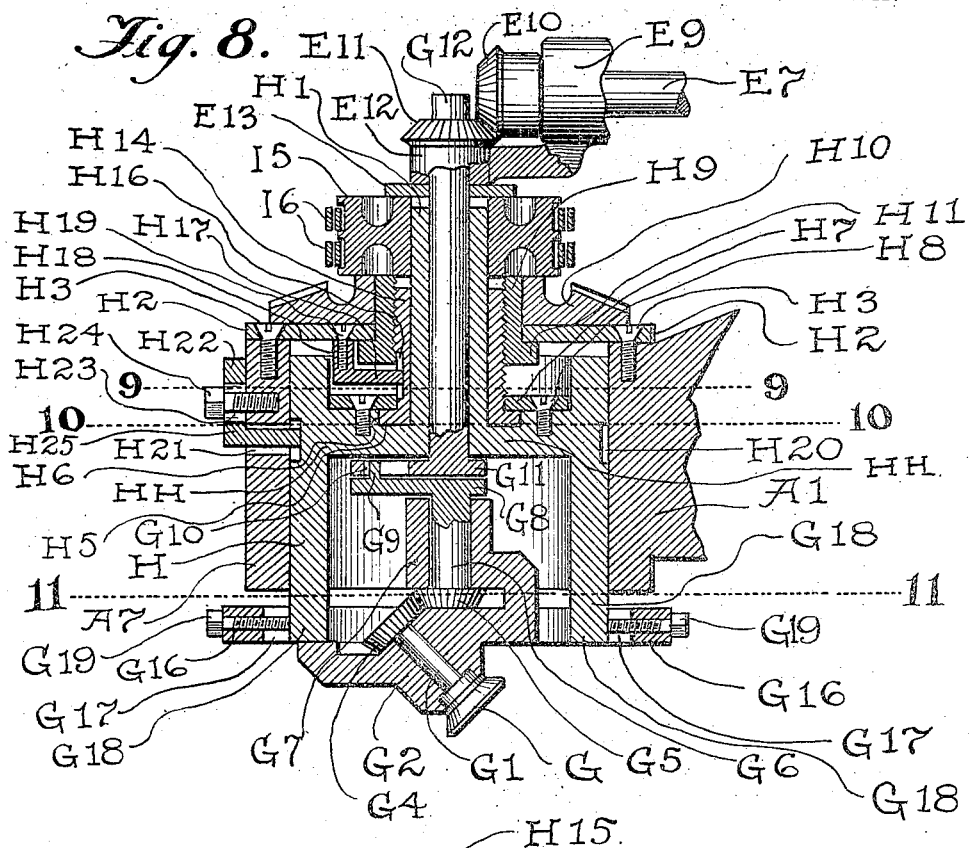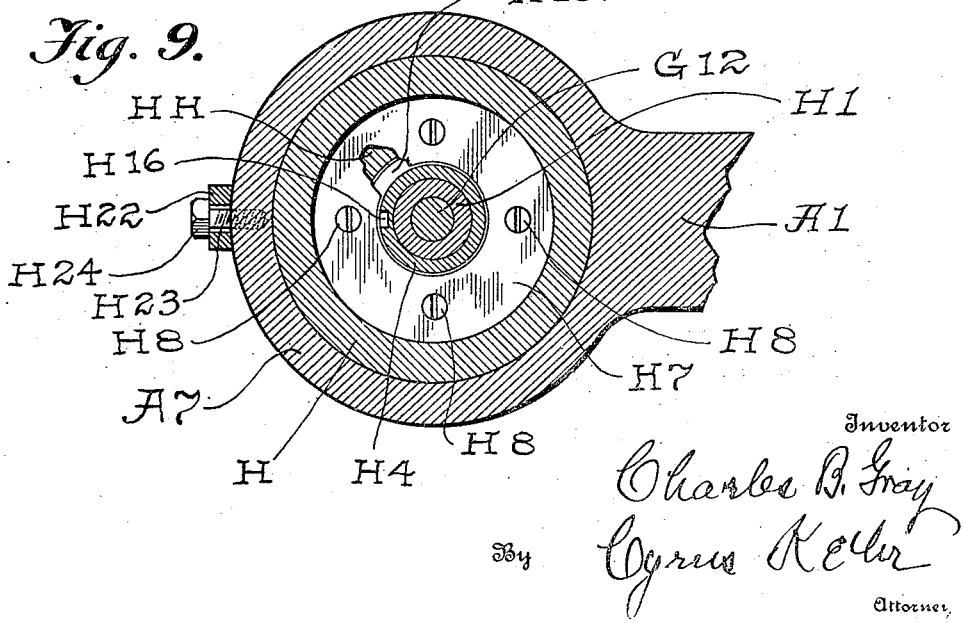

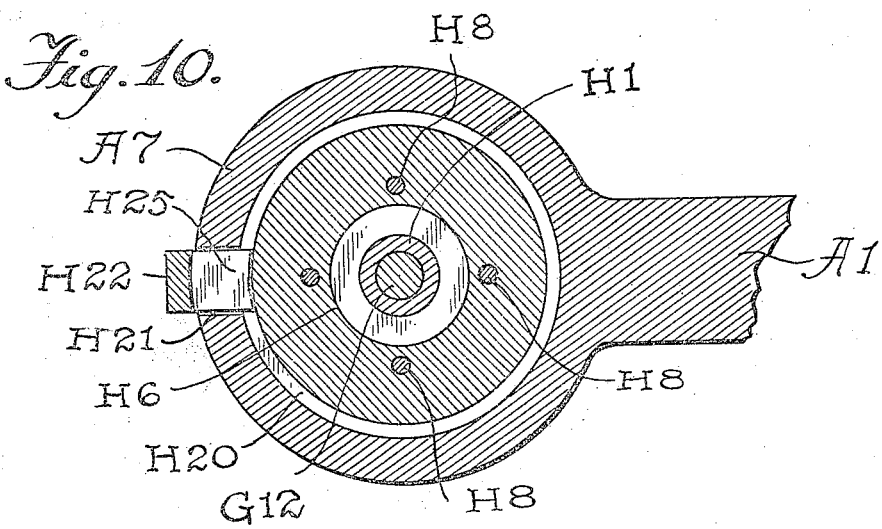
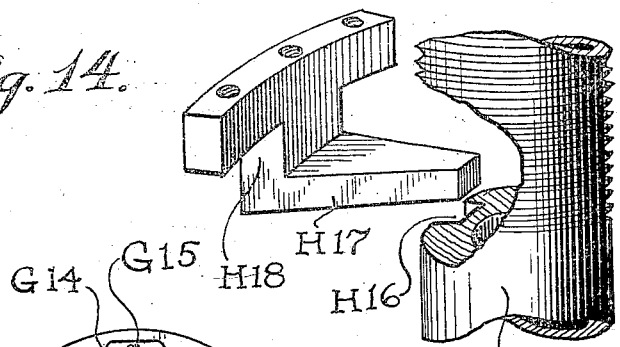
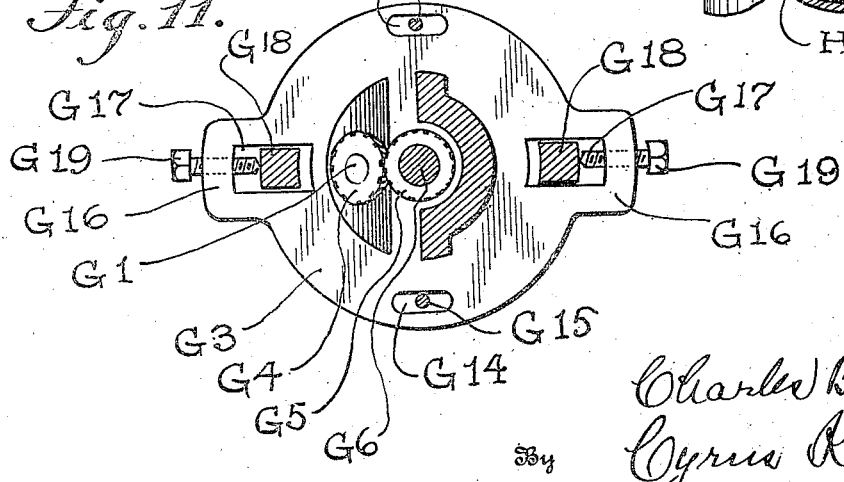

UNITED STATES PATENT OFFICE.

CHARLES B. GRAY, OF KNOXVILLE, TENNESSEE.

MACHINE FOR CUTTING SHEET-FORM MATERIAL.

1,381,088. Specification of Letters Patent. Patented June 7, 1921.

Application filed March 26, 1919, Serial No. 285,341. Renewed February 5, 1921. Serial No. 442,887.

*To all whom it may concern:*

Be it known that I, CHARLES BAXTER GRAY, a citizen of the United States, residing at Knoxville, in the county of Knox and State of Tennessee, have invented a new and useful Improvement in Machines for Cutting Sheet-Form Material, of which the following is a specification, reference being had to the accompanying drawing.

My invention relates particularly to machines for cutting sheet-form material in which machines the cutting elements are two circular, rotary cutters, one being located at one side and the other at the other side of the sheet plane and the edge of one of said cutters working in opposition to the edge of the other cutter, and the sheet to be cut being moved relative to said cutters while the cutting proceeds.

The object of the invention is to produce a machine in which provision is made for changing the direction of the cutting and feeding of the machine, at the will of the operator, without turning the sheet in its plane.

To this end, the machine comprises an upper and a lower turret structure having a common upright axial line, the upper of said turret structures supporting the upper cutter and the lower of said turret structures supporting the lower cutter, power being transmitted to each turret structure for the rotation of the cutter supported by said turret structure, and a common mechanism, controlled by the operator, being associated with both of the turret structures for synchronously turning said structures in the same direction, whereby the rotary cutters are revolved bodily around the common upright axial line of the turret bodies. The mechanism for rotating the rotary cutters is adapted to operate regardless of the position into which the turret bodies have been turned on their common upright axial line.

The invention also comprises novel means for adjusting the cutters transversely to the axial line of the turret structures and relatively adjusting said cutters parallel to said axial line.

In the accompanying drawings,

Fig. 2 is a plan of the same machine;

Fig. 3 is an elevation of the machine looking toward the right as shown in Fig. 1;

Fig. 4 is an elevation looking toward the left of the machine as shown in Fig. 1;

Fig. 5 is a section on the line, 5—5, of Fig. 1, looking toward the right;

Fig. 6 is a section on the line, 6—6, of Fig. 1, looking toward the right;

Fig. 7 is a horizontal section on the line, 7—7, of Fig. 1;

Fig. 8 is an upright section on the line, 8—8, of Fig. 6, looking toward the right;

Fig. 9 is a horizontal section on the line, 9—9, of Fig. 8;

Fig. 10 is a horizontal section on the line, 10—10, of Fig. 8;

Fig. 11 is a horizontal section on the line, 11—11, of Fig. 8;

Fig. 12 is a detached view of the upper turret body;

Fig. 13 is a detached view of the lower turret body;

Fig. 14 is a detail perspective of a portion of the upper turret mechanism;

Fig. 15 is a detail view of a coupling used for joining the cutter shafts;

Figs. 16, 17, 18 and 19 are detail views of the drum which constitutes a part of the mechanism by which the two turret mechanisms are joined for movement in unison;

Figs. 20 and 21 are detail views of a gear mechanism.

Figure 1:
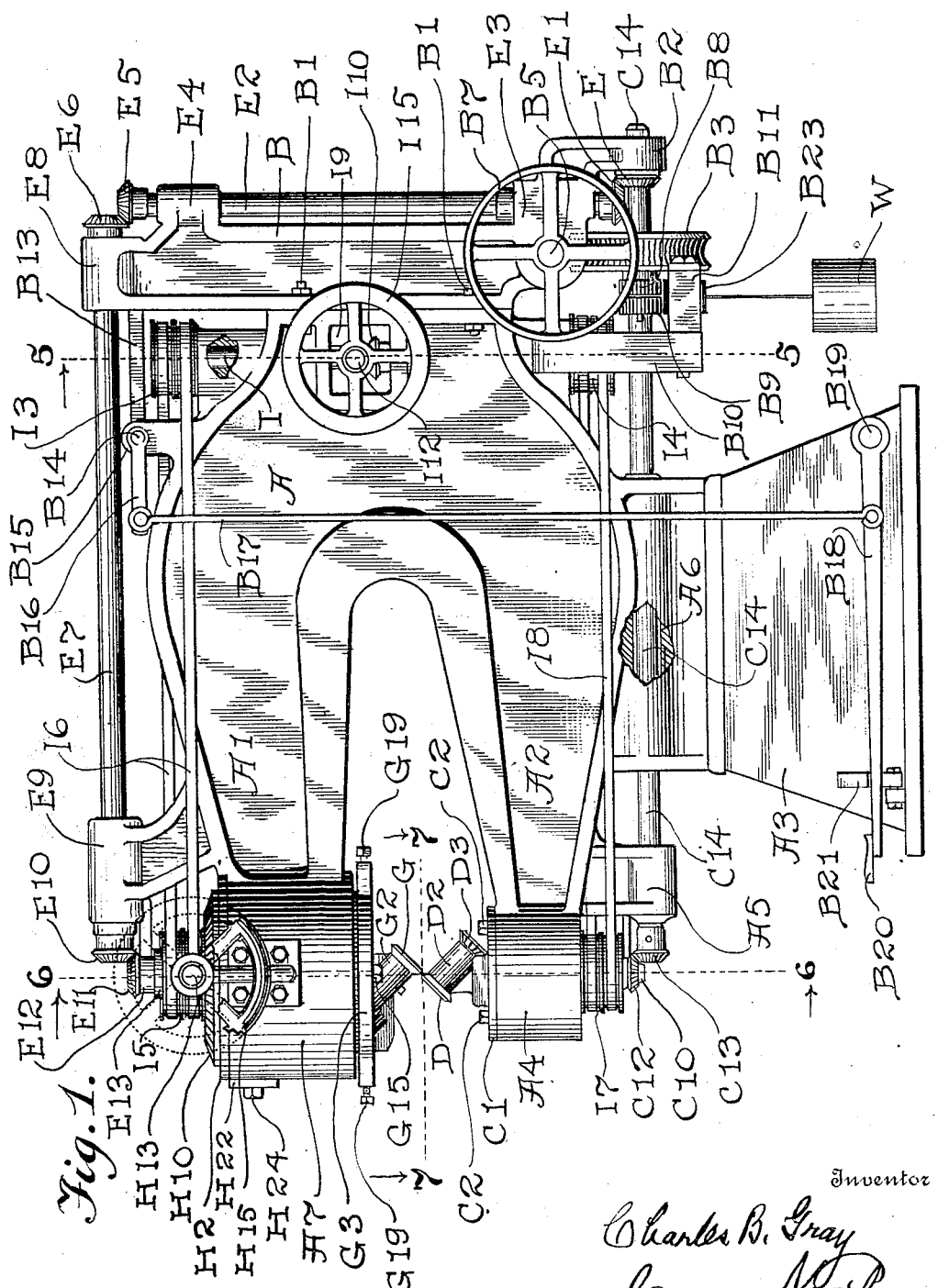
Figure 1 is a front elevation of a machine embodying my invention.

A is the body of the machine. This is seated on a base $A^3$, and has an upper arm, $A^1$, and a lower arm, $A^2$, between which arms is the throat of the machine. One of the rotary cutters is supported between the lower arm and the other rotary cutter is supported on the upper arm, and both of said cutters are positively rotated on their own axes, and both may, at the will of the operator, be revolved simultaneously around an upright axial line in which is the meeting point of the two cutters.

The face of the machine shown by Fig. 1 is herein considered the front of the machine.

On the left hand end of the arm, $A^2$, is an upright bearing, $A^4$, in which rests a turret body, C—$C^6$. On the upper section, C, of said turret body is a circular plate or cap, $C^1$, which extends across the upper end of said bearing and is secured to said body by cap screws, $C^2$. The cap, $C^1$, by resting on the bearing, $A^4$, supports the turret body. In the upper portion of the turret body is a cylindrical chamber, $C^3$, formed around the axial line of said body. A bearing, $C^4$, extends downward on the plate, $C^1$, into said chamber. At the level of the upper face of the cap, $C^1$, said cap has a recess, $C^5$. The lower section, $C^6$, of the turret body, C, extends into the lower part of the bearing, $A^4$, and across the chamber, $C^3$. Cap screws, $C^8$, extend upward through the section, $C^6$, into the section, C, to rigidly join said sections. The section, $C^6$, is extended below the bearing, $A^4$, in the form of a neck, $C^9$. Said neck is surrounded by a drum, 17.

In the section, $C^6$, is a rotary shaft, $C^{10}$, on the upper end of which is a horizontal crank, $C^{11}$, which rests on the upper face of the section, $C^6$, and thus supports said shaft against downward movement. Said shaft extends below the neck, $C^9$, and is there surrounded by a bevel gear wheel, $C^{12}$, which is fixed on said shaft, and meshes with a bevel gear wheel, $C^{13}$, which is fixed on the left hand end of a horizontal shaft, $C^{14}$, which rests in a bearing, $A^5$, on the arm, $A^2$, and has its right hand end resting in a bearing, $B^2$, formed on the lower end of the upright bracket casting, B, which is applied to the right hand end of the machine by means of bolts, $B^1$. Said shaft extends through an opening, $A^6$, in the body, A, of the machine. On the shaft, $C^{14}$, is a worm gear wheel, $B^3$, which meshes with a worm, $B^4$, which is on a horizontal cross shaft, $B^5$, which rests in bearings, $B^6$, in the bracket, B. On the forward end of the shaft, $B^5$, is a pulley, $B^7$, which receives power from a belt not shown.

The worm wheel, $B^3$, is idle on the shaft, $C^{14}$. Immediately at the left of the worm wheel, $B^3$, and attached thereto and also idle on the shaft, $C^{14}$, is a spur gear wheel, $B^8$. Immediately at the left of the spur gear wheel, $B^8$, is a spur gear wheel, $B^9$, which is of the same diameter and has the same number of teeth as the wheel, $B^8$. The wheel, $B^9$, is keyed immovably on the shaft, $C^{14}$. At the left of the wheel, $B^9$, is a fixed arm, $B^{10}$, which extends downward from the body of the machine. To the lower end of said arm is coupled the forward end of a body, $B^{11}$. The rear end of said body is supported by a rod, $B^{12}$, the upper end of which is coupled to a horizontal arm, $B^{13}$, which is rigid on the rear end of the rock shaft, $B^{14}$, which extends horizontally through a bearing, $B^{15}$, formed on the body of the machine. Rigid on the front end of the shaft, $B^{14}$, is an arm, $B^{16}$, which is horizontal and directed leftward from said shaft, while the arm, $B^{13}$, is directed rightward. From the free end of the arm, $B^{16}$, a connecting rod or similar member, $B^{17}$, extends downward over the front of the machine and has its lower end coupled to a pedal bar, $B^{18}$, which is horizontal and parallel to the front of the machine and is pivoted on a pin or bolt, $B^{19}$, fixed on the right hand portion of the base, $A^3$. Said bar extends leftward beyond the left hand part of the base, $A^3$, and there supports a foot piece, $B^{20}$. A hook, $B^{21}$, is secured to the base, $A^3$, in position to allow the pedal bar, $B^{18}$, to move under the hook when the pedal bar has been depressed far enough to engage the gearing, as will be described further on. For this, the flexibility of the pedal bar will allow sufficient sidewise movement to pass beneath said hook. But it is to be remembered that said pedal bar may be held, in the depressed position by the foot of the operator, if so desired. The weight, W, tends to move the body, $B^{11}$, down.

In the body, $B^{11}$, is a chamber, $B^{22}$, within which is a spur gear wheel, $B^{23}$, which is rotatable freely on an axle, $B^{24}$, which is horizontal and beneath and parallel to the shaft, $C^{14}$. The wheel, $B^{23}$, is adapted to be in simultaneous engagement with the spur gear wheels, $B^8$ and $B^9$, but these wheels are so proportioned as to cause engagement between the wheel, $B^8$, and the wheel, $B^{23}$, before the latter engages the wheel, $B^9$, when the wheel, $B^{23}$, is lifted. The wheel, $B^{23}$, receives motion from the wheel, $B^8$, and transmits said motion to the wheel, $B^9$, whereby rotary motion is transmitted to the shaft, $C^{14}$, it being remembered that the wheel, $B^9$, is immovable on the shaft, $C^{14}$.

The width of the wheel, $B^{23}$, equals the width of the two wheels, $B^8$ and $B^9$; but the parts of the teeth on the wheel, $B^{23}$, which are to mesh with the wheel, $B^9$, are a little shorter than the parts of the teeth of the wheel, $B^{23}$, which are to mesh with the wheel, $B^8$, in order that when the wheel, $B^{23}$, is lifted by depressing the pedal bar, $B^{18}$, the wheel, $B^{23}$, may be engaged by the wheel, $B^8$, and put into motion before the wheel, $B^{23}$, engages the wheel, $B^8$. The object of this is to avoid moving two stationary wheels against each other, whereby gear teeth may be jammed against each other without meshing. If one of the wheels is in rotation, its teeth will roll on the teeth of the other wheel and enter between said teeth. When the wheel, $B^{23}$, is being lifted, the wheel, $B^8$, is already in rotation and is to transmit motion to the then stationary wheel, $B^{23}$, and since the wheel, $B^8$, is in motion, its teeth will roll into position between the teeth of the wheel, $B^{23}$, and put said wheel into motion; and thereafter the wheel, $B^{23}$, now in motion engages the wheel, $B^9$, the teeth of the wheel, $B^{23}$, rolling into position between the teeth of the wheel, $B^9$. While it has been stated above that the wheel, $B^8$, and the wheel, $B^9$, are of the same diameter and have the same number of teeth, it is to be observed that the same progressive engagement between the wheel, $B^{23}$, and $B^8$ and $B^9$, can be effected by making the teeth of the wheel, $B^{23}$, of uniform length radially and somewhat shortening the teeth of the wheel, $B^9$. Or the same result may be reached by somewhat reducing the teeth of the wheel, $B^{23}$, radially opposite the wheel, $B^9$, and also somewhat reducing the teeth of the wheel, $B^9$, radially. What is necessary for this purpose is to establish such relation between the wheel, $B^{23}$, on the one hand and the wheels, $B^8$ and $B^9$, on the other hand, as will bring the wheels, $B^8$ and $B^{23}$, into engagement before the wheels, $B^9$ and $B^{23}$, are brought into engagement. This may be put into other words by saying that the sum of the diameter of the wheel, $B^8$, and the diameter of the adjacent part of the wheel, $B^{23}$, is to exceed the sum of the diameter of the wheel, $B^9$, and the diameter of the adjacent part of the wheel, $B^{23}$.

Thus the rotation of the shaft, $C^{14}$, is under control by the operator for the control of the rotation of the shaft, $C^{10}$, which, as above stated, rests in the lower part of the turret body, C.

The lower rotary cutter and the means for supporting and rotating the same will now be described.

The lower rotary cutter, D, is fixed on the upper end of the slanting rotary shaft, $D^1$, which rests in the bearing, $D^2$, which is formed integral on the cap plate, $C^1$, and has its axis cutting the axis of the turret body, C, and inclined at an angle of about 45° to said axis. The lower end of said shaft projects through the bearing, $D^2$, and has fixed upon it a bevel gear wheel, $D^3$, which meshes with the bevel gear wheel, $D^4$, located in the chamber, $C^5$, in the cap plate, $C^1$. Said bevel gear wheel surrounds and is fixed to the upright shaft, $D^5$, which is rotatable in the bearing, $C^4$. The lower end of the shaft, $D^5$, supports a crank, $D^6$, which is rigid on said shaft and is in a horizontal plane which is parallel to the plane of the crank, $C^{11}$, which, as already described, is supported on the upper end of the shaft, $C^{10}$. Connection between said cranks is formed by a wrist pin, $c^{11}$, rising from the crank, $C^{11}$, into the slot, $D^7$, formed in the crank, $D^6$. Thus rotation of the shaft, $C^{10}$, will be transmitted to the shaft, $D^5$, through said crank, the crank, $C^{11}$, carrying with it the crank, $D^6$.

The highest point in the cutting edge of the rotary cutter, D, must be in the axial line of the turret bodies, C and D. Since it is difficult to so construct said cutter and the parts by which it is supported with such exactness as to bring the highest point in said cutting edge into said axial line, and since said cutter is reduced in diameter by wear and grinding, provision is made for shifting said cutter horizontally and bodily toward and from said axial line. For this purpose, the cap screws, $C^2$, are extended through slots, $c^2$, in the cap plate, $C^1$, in order that when said cap screws are loosened, the cap plate may be shifted horizontally and again secured by tightening the cap screws when the highest point in the cutting edge of the cutter, D, has been brought into the axial line of the turret bodies.

While, as above stated, the axis of the bearing, $D^2$, is at an angle of about 45° to the common axial line of the two turret bodies, it is to be further observed that said angle of 45° is between the axis of the bearing, $D^2$, and the part of the axial line of the turret bodies which is below the axis of the bearing, $D^2$.

In other words, the axis of the bearing, $D^2$, intersects the axial line of the turret bodies to form alternate angles of 45°.

It is further to be observed that these two axes are in a common plane.

Within the upper bearing, $A^7$, is a hollow turret body, H. In said body is a cross partition, H H. On said partition is an upright neck, $H^1$. Said neck and said partition are bored on the axial line of said body and receive a rotary shaft, $G^{12}$. On the upper end of the bearing, $A^7$, is a flat circular plate, $H^2$, which is secured to the wall of said bearing by upright screws, $H^3$, extending downward through said plate. A sleeve, $H^4$, surrounds the neck, $H^1$, and is fitted to the latter for rotation. The lower end of said sleeve rests on the partition, H H, and has an outward directed flange, $H^5$. Adjoining said flange, the partition, H H, has a shoulder, $H^6$, a little higher than said flange. A ring, $H^7$, rests on said shoulder and extends across said flange and is secured by screws, $H^8$, extending through said ring downward into said partition. Said ring holds said sleeve against upward movement independently of the turret body; but rotation of the turret body and the neck, $H^1$, is permitted while said sleeve is held against rotation by means to be described further on. The upper part of the exterior of said sleeve is screw threaded and is surrounded by a shorter interiorly screw threaded sleeve, $H^9$, which extends into a bevel gear wheel, $H^{10}$, which rests on the upper face of the plate, $H^2$. The sleeve, $H^9$, is secured to the bevel gear wheel, $H^{10}$, so as to compel said sleeve to rotate with said bevel gear wheel. The lower part of the sleeve, $H^9$, has an outward directed flange, $H^{11}$, which bears against the lower face of the plate, $H^2$, and prevents upward movement of the sleeve, $H^9$. Rotation of the wheel, $H^{10}$, and the sleeve, $H^9$, will cause the lifting of the sleeve, $H^4$, on account of the threaded engagement between said sleeve and the sleeve, $H^9$; and the lifting of the sleeve. $H^4$, will cause the lifting of the ring, $H^7$, and the turret body, H, the ring, $H^7$, being secured to said body. In a bearing, $H^{12}$, supported on the bearing, $A^7$, rests a horizontal shaft, $H^{13}$, on one end of which is a small bevel gear wheel, $H^{14}$, which is in mesh with the bevel gear wheel, $H^{10}$. On the opposite end of the shaft, $H^{13}$, is a hand wheel, $H^{15}$, by means of which said shaft may be rotated for raising or lowering the turret body.

Means are applied to the sleeve, $H^4$, to positively prevent rotation of said sleeve. For this purpose an upright channel, $H^{16}$, is formed on the exterior of said sleeve above the ring, $H^7$, and an arm, $H^{17}$, extends into said channel. Said arm is rigid on a body, $H^{18}$, which extends upward between the flange, $H^{11}$, of the sleeve, $H^9$, and the adjacent wall of the turret body and bears upward against the plate, $H^2$, and screws, $H^{19}$, extend downward through said plate into said body and bind said body immovably to said plate. Thus the arm, $H^{17}$, holds the sleeve, $H^4$, against rotation, but allows said sleeve to slide up and down on said arm.

An adjustable means for limiting the downward movement of the turret body will next be described. A circumferential channel, $H^{20}$, is formed around the turret body, $H$, within the bearing, $A^7$. Through the wall of the bearing, $A^7$, and opposite the channel, $H^{20}$, is formed an aperture, $H^{21}$. A plate, $H^{22}$, is applied flatwise to the outer face of the bearing, $A^7$, above the aperture, $H^{21}$, and has an upright slot, $H^{23}$. A binding screw, $H^{24}$, extends through said slot and into the wall of said bearing to secure said plate to said bearing. A finger, $H^{25}$, extends from said plate through the aperture, $H^{21}$, into the channel, $H^{20}$. When the upper cutting wheel has been adjusted with reference to the lower cutting wheel, as will be described hereinafter, the plate, $H^{22}$, being at the time made loose by the retraction of the binding screws, $H^{24}$, said plate, $H^{22}$, is moved upward until the finger, $H^{25}$, bears against the upper wall of the channel, $H^{20}$. Then the binding screw, $H^{24}$, is tightened. Thus the turret body is held against subsequently moving downward farther than the position it occupied when the adjustment of the cutting wheels was made.

Above the lower rotary cutter, D, is the upper rotary cutter, G, supported on the lower end of the inclined shaft, $G^1$, which is in a bearing, $G^2$, formed on the horizontal bottom plate, $G^3$, which is secured to and supported by the lower end of the upper turret body, H. On the upper end of the shaft, $G^1$, is a bevel gear wheel, $G^4$, which meshes with a bevel gear wheel, $G^5$, which is fixed on the lower end of the upright shaft, $G^6$, which rests in the upright bearing, $G^7$, formed on the upper face of the bottom plate, $G^3$, within the turret body, H. On the upper end of the shaft, $G^6$, is the horizontal crank, $G^8$, which has an upward-directed wrist pin, $G^9$, extending into a slot, $G^{10}$, which is radial in the horizontal crank, $G^{11}$, fixed on the lower end of the shaft, $G^{12}$, which rests in the neck, $H^1$, of the turret body, H, and receives motion through the bevel gear wheel, $E^{11}$. Through the cranks, $G^8$, and $G^{11}$, motion is transmitted from the shaft, $G^{12}$, to the shaft, $G^6$.

It has already been described that the highest point of the rotary cutter, D, is to be brought into the axial line of the two turret bodies, and means have been described for the purpose of bringing the highest point of said cutter into said line. The lowest point in the cutting edge of the upper rotary cutter, G, is to be similarly brought into the axial line of the turret body.

In the bottom plate, $G^3$, are slots, $G^{14}$, at opposite sides of the turret axis. Cap screws, $G^{15}$, extend upward through said slots into the turret body to bind said plate to said body. Midway between the slots, $G^{14}$, the plate, $G^3$, has horizontal, radial extensions, $G^{16}$, in which are upright slots, $G^{17}$, in which are downward extensions, $G^{18}$, formed on the lower end of the turret body, H. Set bolts, $G^{19}$, extend horizontally through the extensions, $G^{16}$, toward the turret axis and into the slots, $G^{17}$. When the upper rotary cutter is to be adjusted, the cap screws, $G^{15}$, are loosened, and when the appropriate set bolt, $G^{19}$, is retracted and the other set bolt, $G^{19}$, is driven forward until the cutter is in its proper position. Then the cap screws are again tightened and the first set bolt is driven forward against the adjacent extension, $G^{18}$.

It has already been described that the axis of the lower cutter shaft, $D^1$, cuts the upright axial line of the turret bodies. This is at an angle of about 45°. The axis of the upper cutter shaft is parallel or approximately parallel to the lower cutter shaft. But to vary the relation of the meeting edges of the two cutters, the two cutter shafts may be moved out of parallel by slightly turning one or the other of the turret bodies. This is to be done by adjusting the mechanism by which motion is transmitted from the upper turret body to the lower turret body, as is described further on.

It has already been described how the two rotary cutter wheels are moved horizontally to bring the working parts of their cutting edges into the axial line of the turret bodies. There must also be relative up and down adjustment of the rotary cutters. This is effected through the above-described mechanism for raising and lowering the turret body, H. For arranging the adjustment of both cutters, the upper turret body is to be raised high enough to bring the upper cutter above its working position. Then both cutters are to be adjusted horizontally with reference to the axial line of the turret bodies.

Then the upper cutter is to be lowered to its precise elevation.

When the turret bodies and the rotary cutters are positioned as shown in Figs. 1 and 3, the feed of the sheet will be from front to rear. When the direction of feed is to be changed, the two turret bodies are to be appropriately turned in the same direction and to the same extent. This is accomplished by means which will now be described.

An upright shaft, I, extends through the right hand part of the body, A, and its upper end rests in a bearing, $I^1$, while its lower end rests in a bearing, $I^2$. The upper end of the shaft projects above the adjacent bearing and is surrounded by two drums, $I^3$. The lower end of said shaft extends below the lower bearing and is surrounded by two drums, $I^4$. On the neck, $H^1$, of the turret body is a drum, $I^5$, which is at the same height as the drum, $I^3$. Each of said drums, $I^3$, is connected with the drum, $I^5$, by a metal strap or wire cable, $I^6$. One of said cables extends along the front of the machine and has one end wrapped around one of the drums, $I^3$, and then secured to said drum and has the other end wrapped around the drum, $I^5$, and then secured to said drum. The other of said cables extends behind the machine and has one of its ends similarly wrapped around and secured to the other drum, $I^3$, while its other end is similarly wrapped around and secured to the drum, $I^5$; but the ends of the rear cable are wound on the drums in opposition to the winding of the front cable on the drums.

On the neck, $C^9$, of the lower turret structure, is a drum, $I^7$, which is at the same elevation as the drum, $I^4$. Cables, $I^8$, are applied at the front and rear of the machine and to the drums $I^4$, and $I^7$, in the same manner as the cables, $I^6$, are applied to the drums, $I^3$ and $I^5$. If said cables are under suitable tension, the rotation of the shaft, I, will cause the drums, $I^3$ and $I^4$, to rotate in unison and in the same direction and to move the forward cables in one direction and the rear cables in the opposite direction, whereby the drums, $I^5$ and $I^7$, and the upper and lower turret bodies and the parts supported thereby will be turned synchronously and in the same direction.

In the body, A, is a chamber, $I^9$, through which the shaft, I, extends. Within said chamber said shaft is surrounded by a bevel gear wheel, $I^{10}$, which meshes with a bevel gear wheel, $I^{11}$, which is fixed on a horizontal shaft, $I^{12}$, which rests in a bearing, $I^{13}$, which is secured to the body of the machine across the chamber, $I^9$, by cap screws, $I^{14}$. Said shaft projects forward through said bearing and supports a hand wheel, $I^{15}$, fixed to said shaft. By turning said hand wheel, the shaft, $I^{12}$, the gear wheels, $I^{11}$ and $I^{10}$, and the shaft, I, are turned.

The drums, $I^3$, located on the upper end of the shaft, I, are provided with means for adjustment of the tension of the wire cables, $I^6$, as will now be described.

The upper of said drums has in its upper face an annular channel, $I^{16}$. The outer wall of said drum is cut away at $I^{17}$ to allow the wire cable, $I^6$, to pass through said wall into the channel, $I^{16}$, and be there turned to lie flatwise between the inner face of said wall and a binding plate, $I^{18}$. Binding screws $I^{19}$, extend through said binding plate and draw it toward said wall of the channel, $I^{16}$. After said cable has been secured to the drum, $I^5$, the end of said cable is applied to the drum, $I^3$, and secured by the binding plate, $I^{18}$, under tension and with the drum $I^3$, in as nearly as may be its proper position. Said drum is loose on the shaft, I. Above the drum, a disk, $I^{20}$, surrounds the shaft, I, and is secured thereto by a set-bolt, $I^{21}$, extending through the hub, $I^{22}$, of said disk. At one part of its perimeter, the disk supports two interiorly screw threaded bearings, $I^{23}$, which have a common horizontal axis. Between said bearings a lug, $I^{24}$, rises from the disk, $I^3$. A set-bolt, $I^{25}$, extends through each of the bearings, $I^{23}$, and abuts against the adjacent face of the lug, $I^{24}$. Each set-bolt is surrounded by a jam nut, $I^{26}$, whereby the bolt may be secured against accidental turning. By means of these set-bolts the lug, $I^{24}$, is secured to the disk, which, as already described, is fixed on the shaft I. Thus the drum, $I^3$, is also immovably secured to the shaft, I. To partially turn the drum, $I^3$, on said shaft for producing precise adjustment af the cable $I^6$, (after the latter has been secured by means of the binding plate, $I^{18}$) the appropriate set-bolt, $I^{25}$, is retracted and the other set-bolt, $I^{25}$, driven forward, whereby the drum, $I^3$, is slightly turned relative to the disk, $I^{20}$.

The lower drum $I^3$, is identical in form with the upper drum, but the lower drum is inverted. A disk, $I^{20}$, identical with the upper disk, $I^{20}$, excepting that it is inverted, is applied around the shaft, I, inmediately below the lower drum, $I^3$, and in the same manner makes engagement with the drum as the upper disk makes engagement with the upper drum.

The lower drums, $I^4$, are identical in form with the drums, $I^3$, and disks, $I^{20}$, located above and below the drums, $I^4$, make adjustable engagement with said drums, as has already been described concerning the drums, $I^3$.

To cause the upper shearing wheel, G, to rotate in unison with the lower shearing wheel, D, it is required that the upper shafts, $G^6$ and $G^{12}$, turn in unison with the lower shafts, $D^5$ and $C^{10}$. This is accomplished by transmitting motion from the horizontal shaft, $C^{14}$, to the upper shaft, $G^{12}$, Immediately at the left of the bearing, $B^2$, a miter gear wheel, E, surrounds and is keyed to the shaft, $C^{14}$, so as to turn in unison with said shaft. Said wheel meshes with a miter gear wheel, $E^1$, fixed on the lower end of the upright shaft $E^2$, which rests in a lower bearing, $E^3$, and an upper bearing, $E^4$. The upper end of said shaft projects above the bearing, $E^4$, and supports a miter gear wheel, $E^5$, fixed on said shaft. Said miter gear wheel meshes with a miter gear wheel, $E^6$, fixed on the adjacent end of the horizontal shaft, $E^7$, which rests in a left hand bearing, $E^8$, and a right hand bearing, $E^9$. The left hand end of said shaft projects through the bearing, $E^9$, and a miter gear wheel, $E^{10}$, is fixed on said end and meshes with a miter gear wheel, $E^{11}$, having a hub, $E^{12}$, and surrounding and feathered on the upper end of the shaft, $G^{12}$, to compel rotation of said shaft when the wheel, $E^{11}$, is rotated. A washer plate, $E^{13}$, rests upon the drum, $I^5$, and the hub, $E^{12}$, of the wheel, $E^{11}$, rests on said washer plate. The wheels, E, $E^1$, $E^5$, and $E^6$, are to be so proportioned as to cause the shafts, $C^{14}$, and $E^7$, to turn at the same velocity, and the gears, $C^{12}$, $C^{13}$, $E^{10}$ and $E^{11}$, are to be so proportioned as to impart equal velocity to the shaft, $C^{10}$, and the shaft, $G^{12}$. Through the crank connections already described, the shafts, $G^{12}$ and $G^6$, are made to turn in unison and the shafts, $C^{10}$ and $D^5$, are made to turn in unison.

The purpose of said crank connections is to allow the making of horizontal adjustment of the bottom plate, $G^3$, of the upper turret structure and the cap plate, $C^1$, of the lower turret structure. This allows the shafts, $G^6$ and $D^5$, to be put out of axial alinement with the common axial line of the shafts, $G^{12}$ and $C^{10}$, the axial lines of said last mentioned shaft being fixed.

The cog wheels, $B^8$, $B^9$ and $B^{23}$, and the shiftable support for the latter constitute a power control mechanism which serves as a substitute for a clutch. A tooth clutch would be unsuitable because it is not adapted to making quick disengagement; and a friction clutch would not be suitable, because the velocity of the shaft, $C^{14}$, is too low. I have found by use of this improved cog wheel control that the operation is sensitive and quick for engagement and disengagement.

I claim as my invention,

1. In a machine of the nature described, the combination of an upper and lower rotary turret structure, located on a common axial line, a pair of rotary cutters having their edges meeting in said axial line, an oblique shaft supported on the lower turret structure and supporting one of said cutters, and an oblique shaft supported on the upper turret structure and supporting the other of said cutters, and means for driving one of said shafts, substantially as described.

2. In a machine of the nature described, the combination of an upper and a lower rotary turret structure located on a common axial line, a pair of rotary cutters having their edges meeting in said axial line, an oblique shaft supported on the lower turret structure for transverse adjustment and supporting one of said cutters, and an oblique shaft supported on the upper turret structure for transverse adjustment and supporting the other of said cutters, and means for driving one of said shafts, substantially as described.

3. In a machine of the nature described, the combination of an upper and a lower rotary turret structure located on a common axial line, a pair of rotary cutters having their edges meeting in said axial line, an oblique shaft supported on the lower turret structure and supporting one of said cutters, and an oblique shaft supported on the upper turret structure and supporting the other of said cutters, and means for driving both of said shafts substantially as described.

4. In a machine of the nature described, the combination of a turret structure, a transversely adjustable supporting member supported by said turret structure, an oblique shaft on said member, a rotary cutter fixed on said oblique shaft, an upright shaft supported by said member and geared to said oblique shaft, an upright drive shaft on the axial line of said turret structure, means on said drive shaft and said first mentioned upright shaft for making a laterally adjustable engagement between said upright shafts, substantially as described.

5. In a machine of the nature described, the combination of a turret structure, a transversely adjustable supporting member supported by said turret structure, an oblique shaft on said member, a rotary cutter fixed on said oblique shaft, an upright shaft supported by said member and geared to said oblique shaft, an upright drive shaft on the axial line of said turret structure, and cranks on said drive shaft and said first mentioned upright shaft for making a laterally adjustable engagement between said upright shafts, substantially as described.

6. In a machine of the nature described, the combination of a turret structure, a transversely adjustable supporting member supported by said turret structure, an oblique shaft on said member, a rotary cutter fixed on said oblique shaft, an upright shaft supported by said member and geared to said oblique shaft, an upright drive shaft on the axial line of said turret structure, and cranks on said drive shaft and said first mentioned upright shaft, one of said cranks having a slot and the other having a wrist extending to said slot, substantially as described.

7. In a machine of the nature described, the combination of two turret structures placed on a common axial line, a transversely adjustable supporting member supported by each of said turret structures, an oblique shaft on said member, a rotary cutter fixed on said oblique shaft, an upright shaft supported by said member and geared to said oblique shaft, an upright drive shaft on the axial line of said turret structure, means on said drive shaft and said first mentioned upright shaft for making a laterally adjustable engagement between said upright shafts, substantially as described.

8. In a machine of the nature described, the combination of an upright bearing, a turret structure in said bearing, a rotary cutter supported by said structure to extend into the axial line of said structure, a wheel surrounding and threaded to said turret structure and supported upon said bearing, the turning of which wheel causes the raising or lowering of said structure, substantially as described.

9. In a machine of the nature described, the combination of an upright bearing, a turret structure in said bearing, a rotary cutter supported by said structure to extend into the axial line of said structure, a wheel surrounding and threaded to said turret structure and supported upon said bearing, the turning of which wheel causes the raising or lowering of said structure, and means for limiting endwise movement of the turret body, substantially as described.

10. In a machine of the nature described, the combination of an upright bearing, a turret structure in said bearing, a rotary cutter supported by said structure to extend into the axial line of said structure, a wheel surrounding and threaded to said turret structure and supported upon said bearing, the turning of which wheel causes the raising or lowering of said structure and adjustable means for limiting endwise movement of the turret body, substantially as described.

11. In a machine of the nature described, the combination of an upright bearing, a turret structure in said bearing, a rotary cutter supported by said structure to extend into the axial line of said structure, a cog wheel surrounding and threaded to said turret structure and supported upon said bearing, and means for turning said gear wheel, substantially as described.

12. In a machine of the nature described, the combination with a lower bearing, of a lower turret structure comprising an upper section and a lower section joined to the upper section and a cap plate extending across and joined to the upper section and extending across the walls of said bearing to support said structure, a rotary shaft supported by said cap plate, a rotary cutter on said shaft, and means in operative relation with a source of power for rotating said shaft, substantially as described.

13. In a machine of the nature described, the combination with a lower bearing, of a lower turret structure comprising an upper section and a lower section joined to the upper section and a cap plate extending across and joined to the upper section for horizontal adjustment and extending across the walls of said bearing to support said structure, a rotary shaft supported by said cap plate, a rotary cutter on said shaft, and means in operative relation with a source of power for rotating said shaft, substantially as described.

14. In a machine of the nature described, the combination with a lower upright bearing, of a turret structure comprising an upper chambered section and a lower section secured to the upper section, a drive shaft in the lower section on the axial line of the turret structure, a cap plate transversely adjustable on the upper section and extending into the chamber of the upper section and extending across the walls of said bearing, an upright cap plate shaft extending toward said drive shaft, and means connecting said shafts to compel the cap plate shaft to rotate in unison with the drive shaft and to permit lateral adjustment of the cap plate shaft, substantially as described.

15. In a machine of the nature described, the combination with a lower upright bearing, of a turret structure comprising an upper chambered section and a lower section secured to the upper section, a drive shaft in the lower section on the axial line of the turret structure, a cap plate transversely adjustable on the upper section and extending into the chamber of the upper section and extending across the walls of said bearing, an upright cap plate shaft extending toward said drive shaft, means connecting said shafts to compel the cap plate shaft to rotate in unison with the drive shaft and to permit lateral adjustment of the cap plate shaft, an oblique shaft mounted on the cap plate in operative relation with the cap plate shaft, and a rotary cutter on the oblique shaft, substantially as described.

16. In a machine of the nature described, the combination with a lower upright bearing, of a turret structure comprising an upper chambered section and a lower section secured to the upper section, a drive shaft in the lower section on the axial line of the turret structure, a cap plate transversely adjustable on the upper section and extending into the chamber of the upper section and extending across the walls of said bearing, an upright cap plate shaft extending toward said drive shaft, and cross members on said shafts, one of said members having a slot and the other having an extension resting shiftably in said slot to permit lateral adjustment of the cap plate shaft without destroying the engagement between said shafts, substantially as described.

17. In a machine of the nature described, the combination of an upper turret structure and a lower turret structure located on a common upright axial line, an upright shaft located opposite said structures, a drum on each of said turret structures, a pair of drums adjustably surrounding each end of said shaft, and tension members joined to said drums and to the corresponding turret structure drum, substantially as described.

18. In a machine of the nature described, the combination of an upper turret structure and a lower turret structure located on a common upright axial line, an upright shaft located opposite said structures, a drum on each of said turret structures, a pair of drums loosely surrounding each end of said shaft, members secured to said shaft, adjustable means for joining said drums to said members, and tension members joined to said drums and to the corresponding turret structure drum, substantially as described.

19. In a machine of the nature described, the combination of an upper turret structure and a lower turret structure on a common upright axial line, an upright shaft located opposite said structures, a drum on each of said turret structures, a pair of drums adjustably surrounding each end of said shaft, tension members joined to said drums and to the corresponding turret structure drum, and means for turning said shaft, substantially as described.

20. In a machine of the nature described, the combination of a rotary cutter, a drive shaft in operative relation with said cutter, a drive wheel loosely surrounding said shaft, a first cog wheel loosely surrounding said shaft and joined to said drive wheel, a third cog wheel surrounding said shaft beside the first cog wheel and fixed on said shaft, a second cog wheel adapted to be in simultaneous engagement with both the first and third cog wheels, a shiftable support for said second cog wheel, and means controlled by the operator for moving said support, substantially as described.

21. In a machine of the nature described, the combination of a rotary cutter, a drive shaft in operative relation with said cutter, a drive wheel loosely surrounding said shaft, a first cog wheel loosely surrounding said shaft and joined to said drive wheel, a third cog wheel surrounding said shaft beside the first cog wheel and fixed on said shaft, a second cog wheel adapted to be in simultaneous engagement with both the first and third cog wheels, the teeth of said cog wheels being formed to permit the second cog wheel to engage the first cog wheel before the second cog wheel engages the third cog wheel, a shiftable support for said second cog wheel, and means controlled by the operator for moving said support, substantially as described.

In testimony whereof I have signed my name this 17th day of March, in the year one thousand nine hundred and nineteen.

CHARLES B. GRAY.